(12) United States Patent
Rebello et al.

(10) Patent No.: US 10,169,171 B2
(45) Date of Patent: Jan. 1, 2019

(54) METHOD AND APPARATUS FOR ENABLING TEMPORAL ALIGNMENT OF DEBUG INFORMATION

(71) Applicants: Joseph Rebello, Edinburgh (GB); John Traill, Strathaven (GB)

(72) Inventors: Joseph Rebello, Edinburgh (GB); John Traill, Strathaven (GB)

(73) Assignee: NXP USA, Inc., Austin, TX (US)

( * ) Notice: Subject to any disclaimer, the term of this patent is extended or adjusted under 35 U.S.C. 154(b) by 96 days.

(21) Appl. No.: 14/889,448

(22) PCT Filed: May 13, 2013

(86) PCT No.: PCT/IB2013/053885
§ 371 (c)(1),
(2) Date: Nov. 6, 2015

(87) PCT Pub. No.: WO2014/184614
PCT Pub. Date: Nov. 20, 2014

(65) Prior Publication Data
US 2016/0098326 A1    Apr. 7, 2016

(51) Int. Cl.
*G06F 11/34*    (2006.01)
*G06F 11/16*    (2006.01)
(Continued)

(52) U.S. Cl.
CPC ...... *G06F 11/1679* (2013.01); *G06F 11/3476* (2013.01); *G06F 11/364* (2013.01);
(Continued)

(58) Field of Classification Search
CPC ............. H04L 12/2697; H04L 12/2618; H04L 12/2623; H04L 12/2631; H04L 12/2628; H04L 12/2657; H04L 12/266; H04L 12/2663; H04L 12/2665; H04L 43/106; G06F 2201/835; G06F 1/10; G06F 1/12; G06F 11/3476; H04J 3/0661; H04J 3/0664
See application file for complete search history.

(56) References Cited

U.S. PATENT DOCUMENTS

| | | | |
|---|---|---|---|
| 6,456,243 B1 * | 9/2002 | Poilasne | H01Q 1/38 343/700 MS |
| 7,379,846 B1 * | 5/2008 | Williams | G06F 11/079 702/183 |

(Continued)

OTHER PUBLICATIONS

Wikipedia's Precision Time Protocol historical version from Feb. 27, 2013 https://en.wikipedia.org/w/index.php?title=Precision_Time_Protocol&oldid=540828299 (Year: 2013).*

(Continued)

*Primary Examiner* — Joseph O Schell

(57) ABSTRACT

A signal processing device includes at least one timestamp generation component arranged to generate at least one local timestamp value, and to provide the at least one local timestamp value to at least one data link layer module for timestamping of data packets. The signal processing device further includes at least one debug module arranged to receive the at least one local timestamp value and to timestamp debug information based at least partly on the at least one local timestamp value.

18 Claims, 4 Drawing Sheets

(51) Int. Cl.
  G06F 11/36 (2006.01)
  H04L 9/32 (2006.01)
  H04J 3/06 (2006.01)
  G06F 1/10 (2006.01)
  G06F 1/12 (2006.01)
  H04L 12/26 (2006.01)

(52) U.S. Cl.
  CPC ........ G06F 11/3648 (2013.01); H04J 3/0697 (2013.01); H04L 9/3297 (2013.01); *G06F 1/10* (2013.01); *G06F 1/12* (2013.01); *G06F 2201/835* (2013.01); *H04J 3/0667* (2013.01); *H04L 43/106* (2013.01)

(56) References Cited

U.S. PATENT DOCUMENTS

| | | | |
|---|---|---|---|
| 7,545,794 B2 | 6/2009 | Loukianov | |
| 7,809,131 B1* | 10/2010 | Njemanze | G06F 21/725 380/2 |
| 8,116,405 B2 | 2/2012 | Cho et al. | |
| 8,719,452 B1* | 5/2014 | Ding | H04N 21/4344 709/248 |
| 9,450,846 B1* | 9/2016 | Huang | H04L 43/0858 |
| 9,456,243 B1* | 9/2016 | Hughes | H04N 21/44016 |
| 2002/0174415 A1 | 11/2002 | Hines | |
| 2005/0036512 A1* | 2/2005 | Loukianov | H04J 3/0632 370/469 |
| 2007/0268938 A1* | 11/2007 | Dowd | H04J 3/0673 370/509 |
| 2008/0209176 A1 | 8/2008 | Singh et al. | |
| 2009/0150728 A1 | 6/2009 | Barlow et al. | |
| 2009/0158075 A1 | 6/2009 | Biberstein et al. | |
| 2009/0310572 A1* | 12/2009 | Wang | H04J 3/0697 370/336 |
| 2010/0281304 A1* | 11/2010 | Moyer | G06F 11/3648 714/37 |
| 2011/0051754 A1* | 3/2011 | Lansdowne | H04J 3/0673 370/503 |
| 2012/0320933 A1* | 12/2012 | Magee | H04L 12/413 370/503 |
| 2013/0045010 A1 | 2/2013 | Mukai | |
| 2013/0212420 A1* | 8/2013 | Lawson | G05B 19/4185 713/400 |
| 2014/0201354 A1* | 7/2014 | Matthews | H04L 43/04 709/224 |
| 2014/0301213 A1* | 10/2014 | Khanal | H04L 43/04 370/248 |
| 2014/0301215 A1* | 10/2014 | Somoskoi | H04L 43/0852 370/252 |

OTHER PUBLICATIONS

Wikipedia's Server Blade historical version from Mar. 17, 2013 https://en.wikipedia.org/w/index.php?title=Blade_server&oldid=545007193 (Year: 2013).*

International Search Report and Written Opinion correlating to PCT/IB2013/053885 dated Feb. 18, 2014.

* cited by examiner

METHOD AND APPARATUS FOR ENABLING TEMPORAL ALIGNMENT OF DEBUG INFORMATION

FIELD OF THE INVENTION

This invention relates to a signal processing device and a method for enabling temporal alignment of debug information.

BACKGROUND OF THE INVENTION

Modern day complex processing systems are often distributed over numerous boards/racks, and may even be distributed within multiple countries. One example of such complex processing systems is telecoms systems, which are becoming much more sophisticated with many heterogeneous processors on a typical processing blade. Additionally such a processing blade is normally just one in a chassis or rack containing many blades. Integration of these systems poses many problems, requiring the system developer to spend significant effort on analysing and capturing faults. Debugging such a system can become very challenging especially when debugging drivers where access is needed to low level register and memory information. Additionally it can be very difficult to isolate a fault when the source of the error is on another device or blade in another part of the system, or when a blade is physically located in a different location, even country.

As systems become more complex and more distributed, it is becoming harder to debug and pinpoint an error cause due to a remote system effect. A significant contributing factor to this difficulty in identifying the cause of an error is the lack of synchronisation between the debug functionality distributed across the different processing elements within the system.

In conventional systems, synchronisation of debug functionality such as hardware trace is limited to the device level. As such, the accuracy of the synchronisation for the debug functionality is limited by the resolution of the operating system of the local device, which is typically inadequate for identifying the processing events occurring simultaneously (or at relative points in time) across multiple different devices.

There are many debug solutions that provide timestamping functions as part of the OS or application, but these are usually high level and do not timestamp execution at an instruction level. Also the timestamp is usually a generic processor timer rather than a precision system timer that spans the entire network. Significantly the processor timer is often not synchronized to other core timers in a multicore device. As such, it is typically not possible to determine from timestamp information alone what events happened on different processors and log them at the same time to debug and isolate the cause and effect of a fault.

SUMMARY OF THE INVENTION

The present invention provides a signal processing device, a signal processing system comprising such a signal processing device and a method for enabling temporal alignment of debug information as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
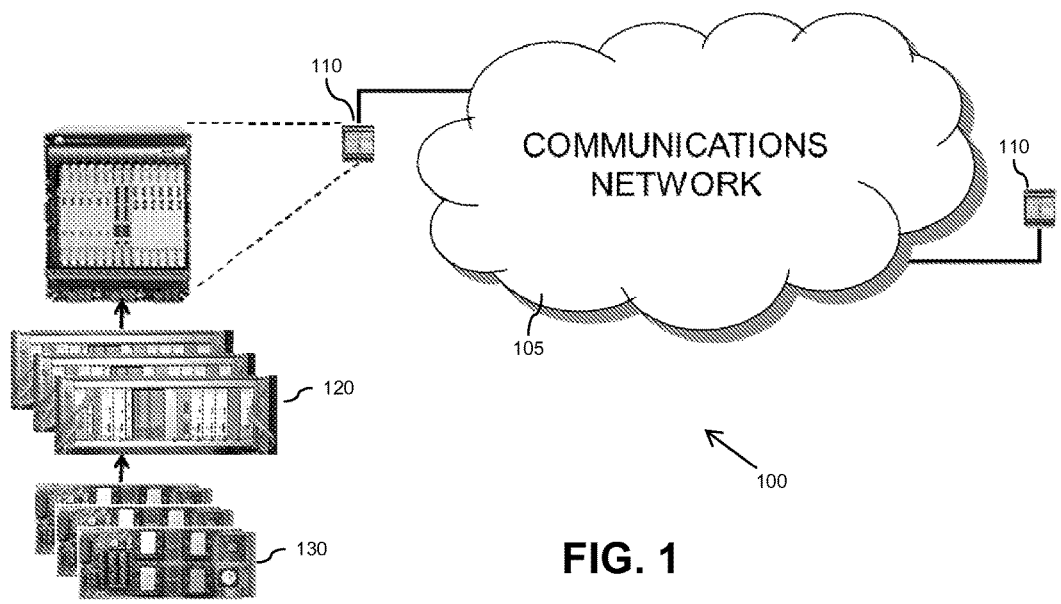
FIG. 1 illustrates a simplified block diagram of an example of a signal processing system.

The present invention will now be described with reference to examples of a method and apparatus for enabling temporal alignment of debug information for a signal processing system. In particular, the present invention will be described with reference to examples of a method and apparatus for enabling temporal alignment of debug information using local precision timing protocol (PTP) data link layer timestamp values to timestamp debug information. However, it will be appreciated that the present invention is not limited to the specific examples herein described with reference to the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In some examples of a first aspect of the present invention, there is provided a signal processing device comprising at least one timestamp generation component arranged to generate at least one local timestamp value, and to provide the at least one local timestamp value to at least one data link layer module for timestamping of data packets, and at least one debug module arranged to receive the at least one local timestamp value and to timestamp debug information based at least partly on the at least one local timestamp value.

In one optional example, the at least one debug module may be arranged to obtain system timing offset information corresponding to the at least one local timestamp value.

In one optional example, the at least one debug module may be arranged to obtain system timing offset information from a system synchronisation component executing on at least one processing core of the signal processing device.

In one optional example, the at least one debug module may be arranged to obtain system timing offset information from at least one memory element of the signal processing device.

In one optional example, the at least one debug module may be arranged to make the obtained system timing offset information available to an external debug tool.

In one optional example, the at least one debug module may be arranged to apply an offset to the at least one local timestamp value in accordance with the obtained system timing offset information and to timestamp debug information based at least partly on the offset local timestamp value.

In one optional example, the timing offset information may comprise precision time protocol, PTP, timing offset information.

In one optional example, the debug information may comprise at least one from a group comprising at least one of:
trace information;
breakpoint information;
watchpoint information; and
event information.

In one optional example, the at least one timestamp generation component may be arranged to provide the at least one local timestamp value to at least one media access controller, MAC, module for timestamping of data packets.

In one optional example, the signal processing device may be implemented within an integrated circuit device comprising at least one die within a single integrated circuit package.

In some examples of a second aspect of the present invention, there is provided a signal processing system comprising at least one signal processing device according of the first aspect of the present invention.

In some examples of a third aspect of the present invention, there is provided method of enabling temporal alignment of debug information for a signal processing system. The method comprises, within a signal processing device, receiving debug information;
obtaining a local timestamp value used for timestamping of data packets within a data link layer of the signal processing device, and timestamping the received debug information based at least partly on the local timestamp value.

Referring first to FIG. 1, there is illustrated a simplified block diagram of an example of a signal processing system 100, for example comprising a telecommunications system. In the illustrated example, the signal processing system 100 is distributed over a plurality sites 110 interconnected by some form of communications network 105, with sites often being located long distances from one another, for example in different countries. Each sight may comprise a plurality of server racks, such as illustrated at 120. Each rack 120 may comprise multiple processing 'blades' or equivalent server nodes 130, which in turn may comprise multiple signal processing devices, such as multi-core processor integrated circuit devices.

Debugging such a system can become very challenging especially when debugging drivers where access is needed to low level register and memory information. In particular, temporally aligning debug information from different signal processing devices within the system that may be physically located in different locations, even country, can be extremely difficult. Although debug solutions are known that provide timestamping functions as part of the operating system or application, these are conventionally high level and do not timestamp execution at an instruction level. Also the timestamp source is usually a generic processor timer. As a result, such conventional timestamping of debug information utilises independent clock sources and timing references for each individual signal processing device within the system. Consequently, the timestamping of debug information for individual signal processing devices is typically not synchronized across different signal processing devices within a system; often not even across individual cores within a multicore device.

The Precision Time Protocol (PTP) is a protocol used to synchronize clocks throughout a computer network, and is defined in the IEEE 1588 standards. The IEEE 1588 standards describe a hierarchical master-slave architecture for clock distribution. Under this architecture, a time distribution system consists of one or more communication media (network segments), and one or more clocks.

A PTP slave needs two pieces of information for synchronization:
(1) how much its clock is offset from the PTP master, and
(2) the network propagation delay.

Figure 2:
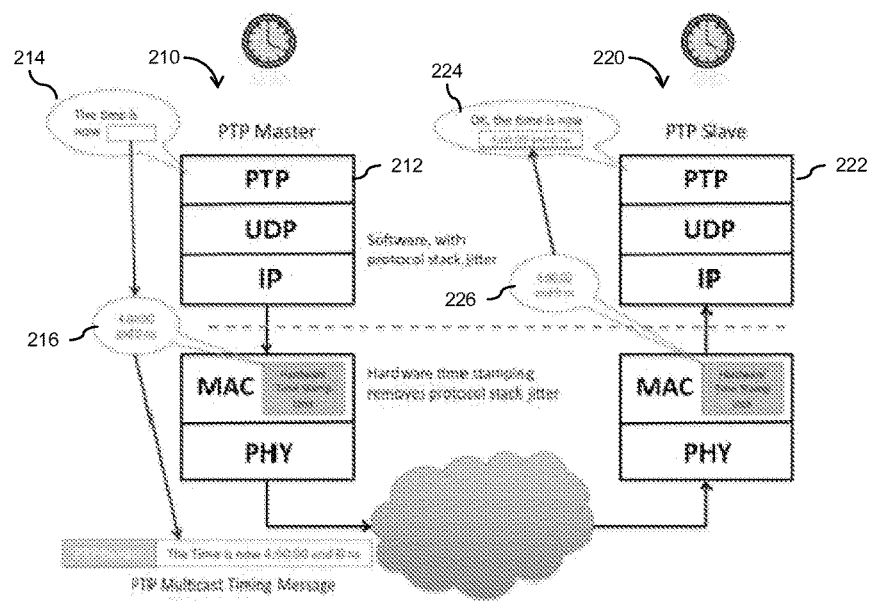
FIG. 2 illustrates a simplified example of such a Precision Time Protocol (PTP) synchronisation message.

Both of these bits of timing offset information are obtained through various timestamped messaging sequences between the master and slave, as defined in the IEEE 1588 standards. A PTP slave may remain synchronised with the PTP master by way of synchronisation messages multicast by the PTP master. FIG. 2 illustrates a simplified example of such a PTP synchronisation message. A PTP layer 212 within the PTP master 210 node generates a synchronisation message, illustrated generally at 214, to be multicast to its respective PTP slaves, such as the PTP slave node illustrated at 220. The synchronisation message is timestamped, for example by way of hardware timestamping in the Media Access Controller (MAC) layer as indicated at 216, before being multicast to the PTP slave node 220. Upon receipt of the synchronisation message, the synchronisation message is timestamped with a local timestamp, for example by way of hardware timestamping in the MAC layer as indicated at 226. A PTP layer 222 within the PTP slave node 220 receives the timestamped synchronisation message, and by applying the network propagation information previously obtained is able to synchronise with the PTP master node 220 (e.g. determine/calibrate an offset between its own hardware timestamp and that of the PTP master node 220).

Thus, the IEEE1588 PTP protocol provides a system level synchronisation mechanism whereby hardware timestamping of synchronisation messages at the data link layer (e.g. MAC layer) is used to derive timing offset information between the PTP master node 210 and the PTP slave node 220. This timing offset information may then be used by the PTP slave node 220 to synchronise (i.e. offset) its local hardware timestamp with the hardware timestamp of the PTP master node 210, and thus with the rest of the system. However, such data link layer hardware timestamping is typically not accessible to debug functionality, and the timing offset information is typically part of the operating system and/or an application and thus conventionally also not available at an instruction level as required for debug functionality such as timestamping within a debug trace.

Figure 3:
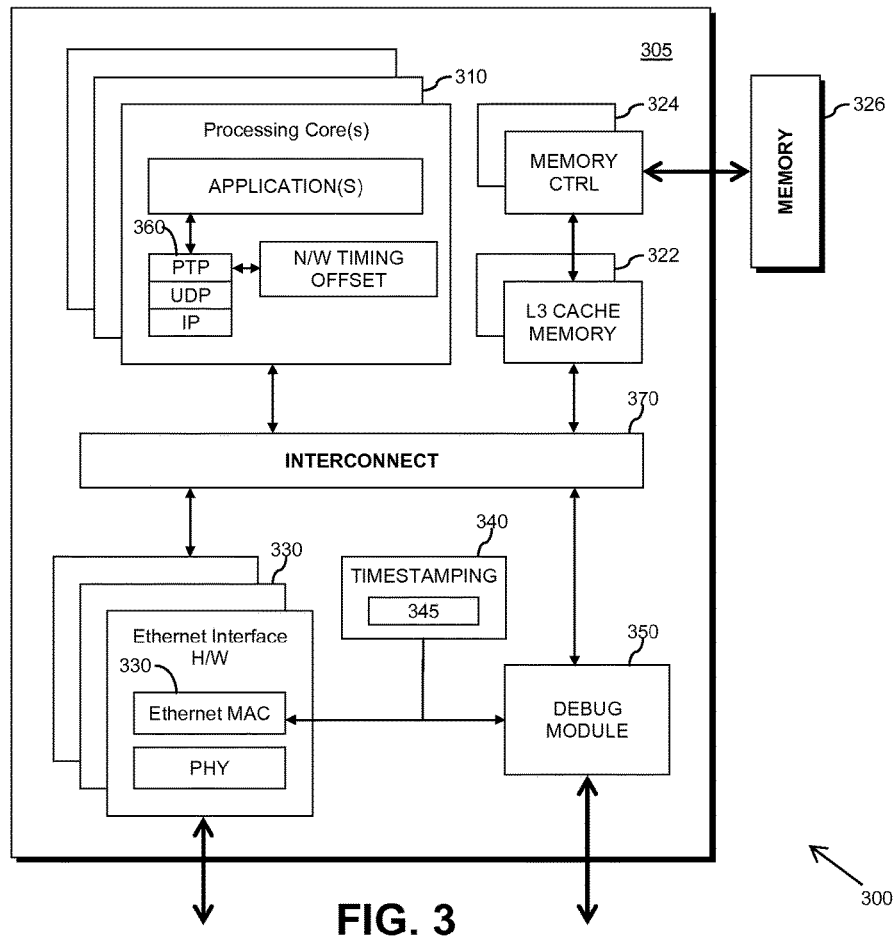
FIG. 3, illustrates a simplified block diagram of an example of a signal processing device.

Referring now to FIG. 3, there is illustrated a simplified block diagram of an example of a signal processing device 300, such as may be implemented within one or more of the processing blades/server nodes 130 illustrated in FIG. 1, and which in the illustrated example is implemented within an integrated circuit device 305 comprising at least one die within a single integrated circuit package. The signal processing device 305 may comprise one or more processing cores, illustrated generally at 310, arranged to execute computer program code. The processing core(s) 310 is/are operably coupled to one or more memory elements, such as integrated memory (cache) 322 and/or external memory elements 326 (via one or more memory controllers 324), via an interconnect component 370.

The processing core(s) 310 is/are further operably coupled to one or more network interface modules, which in the illustrated example comprise Ethernet interface modules 330. The network (Ethernet) interface modules 330 provide the Layer 1 (physical) and Layer 2 (data link—including Media Access Controller (MAC)) protocol layers via which the signal processing device 300 is able to transmit and receive data packets across a network, for example such as the communications network 105 illustrated in FIG. 1. Higher layers of the protocol stack, for example such as the IP (Internet Protocol) layer, UDP (User Datagram Protocol) layer, etc. may be implemented by way of computer program code executed on one or more of the processing cores 310.

The signal processing device 300 further comprises one or more timestamp generation components 340 arranged to generate at least one local timestamp value, illustrated generally at 345.

Figure 4:
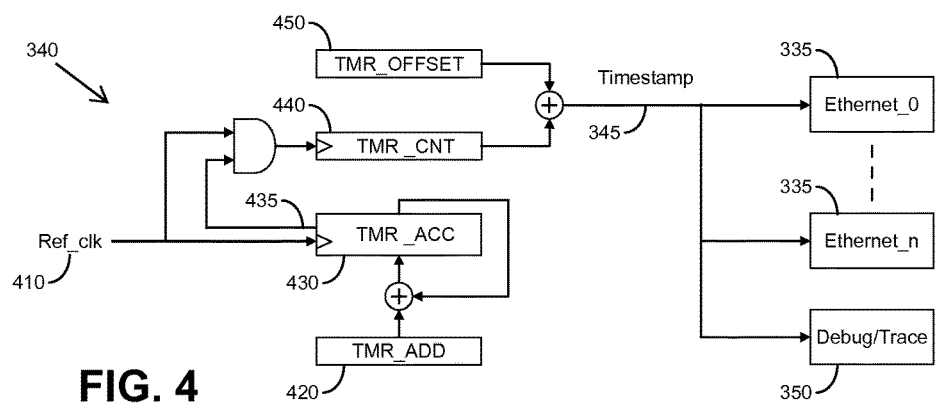
FIG. 4 illustrates a simplified block diagram of an example of a timestamp generation component.

FIG. 4 illustrates a simplified block diagram of an example of the timestamp generation component 340. A timer drift compensation addend register (TMR_ADD) 420 is used to hold a timer frequency compensation value. The nominal frequency of the timestamp counter is determined by the frequency division ratio (FreqDivRatio) and a frequency of a reference clock signal (Ref_clk) 410. The FreqDivRatio is the ratio between the frequency of the reference clock and the desired timestamp increment frequency. The timer drift compensation addend register (TMR_ADD) 420 is programmed with $2^{32}$/FreqDivRatio. The ADDEND value held within the timer drift compensation addend register (TMR_ADD) 420 is added to an accumulator register (TMR_ACC) 430 at every active edge of the reference clock signal (Ref_clk) 410. An overflow pulse 435 of the accumulator register (TMR_ACC) 430 is used to increment a timer counter register (TMR_CNT) 440. A timer offset register (TMR_OFFSET) 450 is used to adjust the value held in the timer counter register (TMR_CNT) 440; the values of the timer counter register (TMR_CNT) 440 and the timer offset register (TMR_OFFSET) 450 being added together to generate the local timestamp value 345.

The timestamp generation component 340 is further arranged to provide the local timestamp value 345 to the network (Ethernet) interface module(s) 330, and in particular to a data link layer 335 of the/each network (Ethernet) interface module(s) 330, for timestamping of received and/or transmitted data packets.

The signal processing device 300 further comprises at least one debug module 350, arranged to provide debugging functionality within the signal processing device 300. In particular, the debug module 350 is arranged to make debug information obtained from within the signal processing device 300 available to an external debug tool (not shown). For example, the debug module 350 may be arranged to output debug information substantially directly to a debug tool via a dedicated debug port, such as illustrated generally at 355, or via a network connection such as via (one of) the network (Ethernet) interface module(s) 330. Additionally/alternatively, the debug module 350 may be arranged to make debug information available to an external debug tool by writing the debug information to, say, external memory 326 for subsequent retrieval by the external debug tool. The debug information may comprise any form of information intended to help in the detection and analysis of faults etc. obtained from within the signal processing device 300. For example, the debug information may comprise one or more of trace information, breakpoint information, watchpoint information, and/or event information.

The debug module 350 is further arranged to receive the local timestamp value 345 and to timestamp debug information based at least partly on the at least one local timestamp value 345. In this manner, debug information for the signal processing device 300 may be timestamped using a single, common timestamp value generated by the timestamp generation hardware component 340. As such, debug information across the multiple processing cores 310 of the signal processing device 300 may easily be temporally aligned based on this common timestamp value.

Furthermore, by using such a local timestamp value 345 also used within the data link layer 335 of the of the/each network (Ethernet) interface module(s) 330 for timestamping received and/or transmitted data packets, a significantly finer granularity of timestamping, and thus significantly greater accuracy, may be achieved as compared with conventional techniques where the accuracy of the synchronisation for the debug functionality is limited by the resolution of the operating system (OS) of the local device, which is typically inadequate for identifying the processing events occurring simultaneously (or at relative points in time) across multiple different devices. For example, the timing granularity of an OS like Linux is milliseconds. High resolution timer (HRT) implementations can get this down to microseconds; however the addition of HRT to the OS has a significant performance impact. By contrast, the timing granularity of a timestamp value used within the data link layer for timestamping received and/or transmitted data packets, such as used to implement IEEE1588 PTP timestamping, comprises nano second resolution. Core timers can have similar granularity to that of IEEE1588 PTP timestamping, but an OS cannot read and timestamp an event at this resolution due to code execution time and overheads. Additionally there is no synchronization mechanism between core timers.

In some examples of the present invention, the signal processing device 300 may be arranged to obtain, or otherwise derive, system timing offset information corresponding to the local timestamp value 345 generated by the timestamp generation component 340, whereby such system timing offset information enables the local timestamp value 345 to be offset to, or otherwise aligned with, a system timing reference. For example, and as illustrated in FIG. 3, a system synchronisation component, such as the PTP layer illustrated at 360, may be arranged to be executed by one or more of the processing cores 310 of the signal processing device 300. The system synchronisation component 360 may be arranged to determined system timing offset information 365 comprising, for example, how much the local timestamp value 345 is offset from a system timing reference (e.g. a PTP master node timestamp value), a network propagation delay between the signal processing device 300 and a source of the system timing reference (e.g. the PTP master node), etc.

In this manner, by using the local timestamp value 345 also used within the data link layer 335 of the of the/each network (Ethernet) interface module(s) 330 for timestamping received and/or transmitted data packets, and thus for which system timing offset information 365 is available through the system synchronisation component 360, which in the illustrated example comprises PTP timing offset information available through the PTP layer, the timestamping of the debug information may be temporally aligned with a system timing reference. As such, debug information across multiple signal processing devices within a system may be temporally aligned with a system timing reference, and thus to one another.

In some examples, the debug tool 350 may be arranged to timestamp debug information substantially directly with the local timestamp value 345. An external debug tool (not shown) may then obtain the system timing offset information 365 to subsequently temporally align the debug information with a corresponding system timing reference. For example, the PTP layer 360 may be arranged to store the system timing offset information 365 in, say, external memory 326. An external debug tool may thus be arranged to obtain the system timing offset information 365 substantially directly from the external memory 326. Alternatively, an external debut tool may be arranged to request the system timing offset information 365 via the debug module 350. The debug module 350 may, in response to such a request, retrieve the system timing offset information 365 from memory 326, or alternatively request or otherwise obtain the system timing offset information 365 directly from the PTP layer 360.

In some alternative examples, the debug tool 350 may be arranged to obtain the system timing offset information 365, for example substantially directly from the PTP layer 360 or from memory 326, apply an offset to the local timestamp value 345 in accordance with the obtained system timing offset information 360 and to timestamp debug information based at least partly on the offset local timestamp value. In this manner, debug information may be made available to an external debug tool that has already been temporally aligned to a system timing reference.

Thus, in the illustrated example a technique is provided comprising using a system referenced timestamp corresponding to the IEEE1588 PTP protocol to timestamp the debug information, for example on a low level (instruction level) hardware trace or Data Path Accelerator Architecture (DPAA) packet trace across heterogeneous processor systems. This enables offline analysis of the data with other signal processing devices in the system to determine what was executing at concurrent times. Consequently, if there was an error condition or debug event (e.g. a trace event, breakpoint event, watchpoint event, etc.) captured on one device, concurrent trace logs on the other devices may be captured to determine the functions/instructions that were executing at the relevant timeframe on those other devices.

Figure 5:
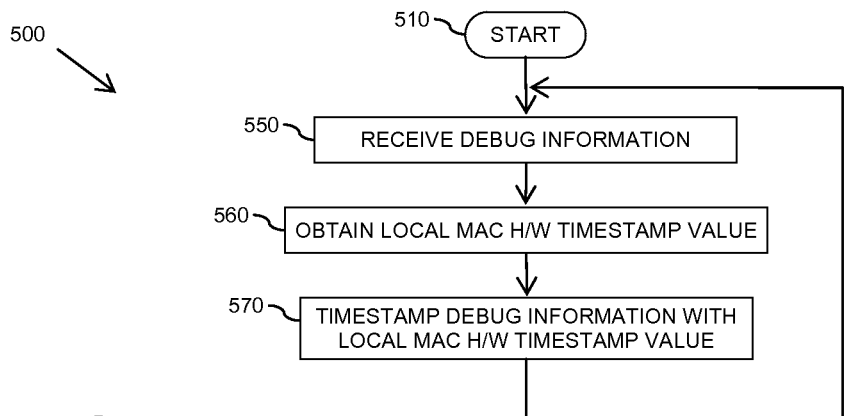
FIG. 5 illustrates a simplified flowchart of an example of a method of enabling temporal alignment of debug information for a signal processing system.

Referring now to FIG. 5, there is illustrated a simplified flowchart 500 of an example of a method of enabling temporal alignment of debug information for a signal processing system, such as may be implemented, at least in part, within the debug module 350 of the signal processing device 300 of FIG. 3. The method starts at 510, and moves on to 550 with the receipt of debug information. Such debug information may comprise any form of information intended to help in the detection and analysis of faults etc. obtained from within, say, the signal processing device. For example, the debug information may comprise one or more of trace information, breakpoint information, watchpoint information, and/or event information. Next, at 560, a local timestamp value used for timestamping of data packets within a data link layer of the signal processing device, such as the local timestamp value 345 in FIG. 3, is obtained. The received debug information is then timestamped based at least partly on the local timestamp value, at 570. In the illustrated example, the method them loops back to 550, where further debug information may be received.

In this manner, debug information for the signal processing device may be timestamped using a single, common timestamp value generated by a timestamp generation hardware component. As such, debug information across the multiple processing cores of the signal processing device 300 may easily be temporally aligned based on this common timestamp value.

Furthermore, by using such a local timestamp value also used within the data link layer of the of the signal processing device for timestamping received and/or transmitted data packets, a significantly finer granularity of timestamping, and thus significantly greater accuracy, may be achieved as compared with conventional techniques where the accuracy of the synchronisation for the debug functionality is limited by the resolution of the operating system of the local device, which is typically inadequate for identifying the processing events occurring simultaneously (or at relative points in time) across multiple different devices.

Figure 6:
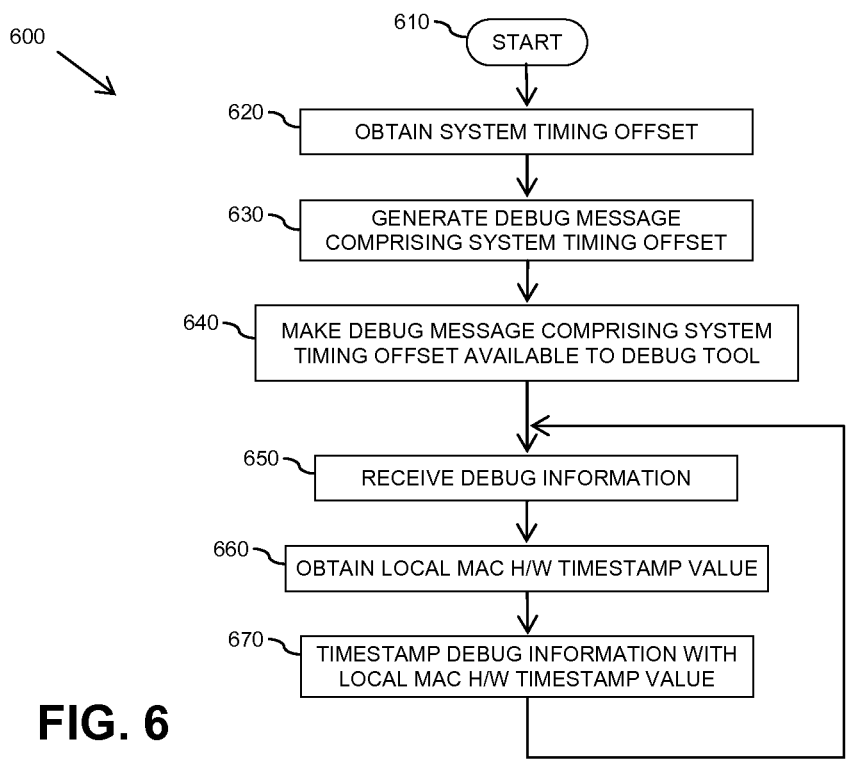
FIG. 6 illustrates a simplified flowchart of an alternative example of a method of enabling temporal alignment of debug information for a signal processing system.

Referring now to FIG. 6, there is illustrated a simplified flowchart 600 of an alternative example of a method of enabling temporal alignment of debug information for a signal processing system, such as may be implemented, at least in part, within the debug module 350 of the signal processing device 300 of FIG. 3. The method starts at 610, and moves on to 620 where system timing offset information, such as the PTP system timing offset information 365 of FIG. 3, is obtained. For example, the system timing offset information may be stored in, say, external memory 326. Accordingly, the system timing offset information may be obtained substantially directly from the external memory. Alternatively, the system timing offset information may be obtained substantially directly from a system synchronisation component executing on one or more processing cores of the signal processing device. Next, at 630, a debug message is generated comprising the system timing offset information. The debug message comprising the system timing offset information is then made available to an external debug tool at 640. For example, the debug message may be made available to an external debug tool by writing the debug message to, say, external memory for subsequent retrieval by the external debug tool. Alternatively, the debug message may be transmitted substantially directly to a debug tool via a dedicated debug port, or via a network connection such as an Ethernet connection. The method then moves on to 650 with the receipt of debug information. Such debug information may comprise any form of information intended to help in the detection and analysis of faults etc. obtained from within, say, the signal processing device. For example, the debug information may comprise one or more of trace information, breakpoint information, watchpoint information, and/or event information. Next, at 660, a local timestamp value used for timestamping of data packets within a data link layer of the signal processing device, such as the local timestamp value 345 in FIG. 3, is obtained. The received debug information is then timestamped based at least partly on the local timestamp value, at 670. In the illustrated example, the method them loops back to 650, where further debug information may be received.

In this manner, by using the local timestamp value also used within the data link layer of the of the signal processing device for timestamping received and/or transmitted data packets, and thus for which system timing offset information may be available through a system synchronisation component, the timestamping of the debug information may be temporally aligned with a system timing reference. As such, debug information across multiple signal processing devices within a system may be temporally aligned with a system timing reference, and thus to one another.

Figure 7:
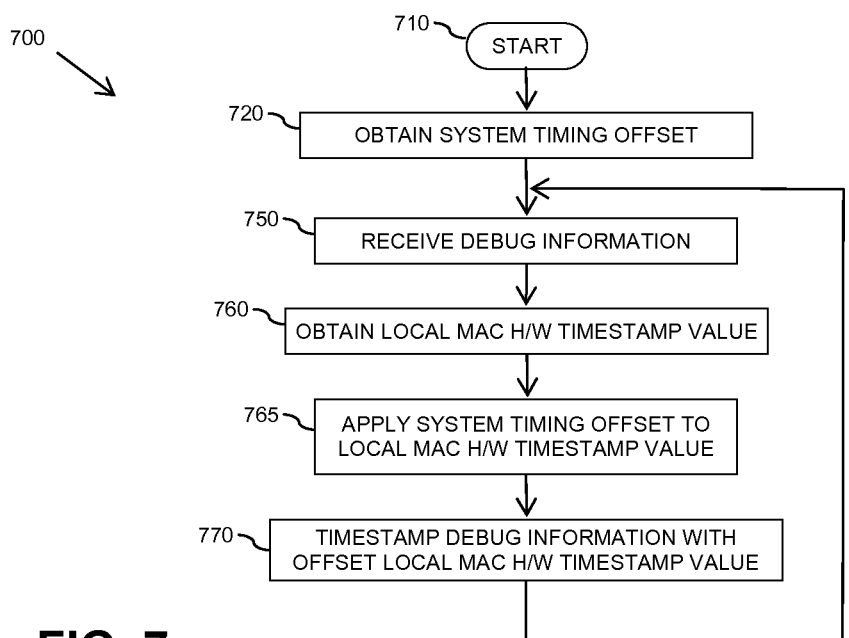
FIG. 7 illustrates a simplified flowchart of a further alternative example of a method of enabling temporal alignment of debug information for a signal processing system.

Referring now to FIG. 7, there is illustrated a simplified flowchart 700 of a further alternative example of a method of enabling temporal alignment of debug information for a signal processing system, such as may be implemented, at least in part, within the debug module 350 of the signal processing device 300 of FIG. 3. The method starts at 710, and moves on to 720 where system timing offset information, such as the PTP system timing offset information 365 of FIG. 3, is obtained. For example, the system timing offset information may be stored in, say, external memory 326. Accordingly, the system timing offset information may be obtained substantially directly from the external memory. Alternatively, the system timing offset information may be obtained substantially directly from a system synchronisation component executing on one or more processing cores of the signal processing device. The method then moves on to 750 with the receipt of debug information. Such debug information may comprise any form of information intended to help in the detection and analysis of faults etc. obtained from within, say, the signal processing device. For example, the debug information may comprise one or more of trace information, breakpoint information, watchpoint information, and/or event information. Next, at 760, a local timestamp value used for timestamping of data packets within a data link layer of the signal processing device, such as the local timestamp value 345 in FIG. 3, is obtained. In the method of FIG. 7, an offset is applied to the local timestamp value in accordance with the obtained system timing offset information, at 765. The received debug information is then timestamped based at least partly on the offset local timestamp value, at 770. In the illustrated example, the method them loops back to 750, where further debug information may be received.

In this manner, timestamped debug information pre-aligned with a system timing reference may be provided to an external debug tool, substantially alleviating the need for the external debug tool to subsequently perform addition temporal alignment of the debug information.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device, such as in the example illustrated in FIG. 3. Alternatively, the examples may be implemented as any number of separate integrated circuits or separate devices interconnected with each other in a suitable manner. For example, it is contemplated that the processing core(s) 310, network (Ethernet) interface modules 330, the timestamp generation component 340 and/or the debug module 350 of the illustrated example may be distributed across any number of separate integrated circuits or separate devices interconnected with each other.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A signal processing device for communication within a signal processing system comprising a master node and multiple signal processing devices including the signal processing device, the master node including circuitry and being in communication with the multiple signal processing devices, the signal processing device comprising:
   at least one processing core configured and arranged to execute computer program code and to transmit data across at least one data layer, including a data link layer;
   at least one timestamp generation component, including circuitry, configured and arranged to generate at least one local timestamp value, and to provide the at least one local timestamp value;
   a data link layer module, including circuitry, configured and arranged to receive the at least one local timestamp value for timestamping of data packets within the data link layer; and
   at least one debug module, including circuitry, configured and arranged to:
      receive the at least one local timestamp value and to cause temporal alignment of debug information across the multiple signal processing devices within the signal processing system by:
         timestamping the debug information corresponding to the signal processing system based at least partly on the at least one local timestamp value and timing information obtained from the master node, and
         outputting the timestamped debug information to a debug tool of the signal processing system.

2. The signal processing device of claim 1, wherein the timing information includes system timing offset information that is indicative of an offset between the at least one local timestamp value and a system timing reference, wherein the at least one debug module is configured and arranged to obtain the system timing offset information corresponding to the at least one local timestamp value, and to output the timestamped debug information to an external debug tool, the timestamped debugged information being temporally aligned with debug information from the other signal processing devices of the plurality of the signal processing system located at different physical locations than the signal processing device.

3. The signal processing device of claim 2, wherein the at least one debug module is configured and arranged to obtain the system timing offset information from a system synchronisation component of the signal processing system, the system sychronisation component configured and arranged to execute on at least one processing core of the signal processing device and to determine the system timing offset information from a master node timestamp value received from the master node.

4. The signal processing device of claim 2, wherein the at least one debug module is configured and arranged to obtain system timing offset information from at least one memory element of the signal processing device.

5. The signal processing device of claim 2, wherein the at least one debug module is configured and arranged to make the obtained system timing offset information available to an external debug tool.

6. The signal processing device of claim 2, wherein the at least one debug module is configured and arranged to apply an offset to the at least one local timestamp value in accordance with the obtained system timing offset information and to timestamp the debug information based at least partly on the offset local timestamp value.

7. The signal processing device of claim 2, wherein the timing offset information comprises precision time protocol.

8. The signal processing device of claim 1, wherein the debug information comprises at least one of:
   trace information;
   breakpoint information;
   watchpoint information; and
   event information.

9. The signal processing device of claim 1, wherein the at least one timestamp generation component is configured and arranged to provide the at least one local timestamp value to at least one media access controller (MAC) module for timestamping of data packets.

10. The signal processing device of claim 1 implemented within an integrated circuit device comprising at least one die within a single integrated circuit package.

11. A signal processing system comprising at least one signal processing device according to claim 1.

12. The signal processing device of claim 1, the signal processing device further including a plurality of processing cores configured and arranged to execute computer program code, and wherein the at least one signal processing device configured and arranged within a server blade located within a server rack at a site of a plurality of sites of the signal processing system, and
   wherein the at least one debug module is further configured and arranged to temporally align debug information for the plurality of processing cores with respect to one another by timestamping the debug information for the plurality of processing cores of the signal processing device.

13. The signal processing device of claim 1, wherein the at least one debug module is further configured and arranged to provide system timing offset information to an external debug tool.

14. The signal processing device of claim 1, further including at least one memory element configured and arranged to provide system timing offset information to an external debug tool.

15. The signal processing device of claim 1, wherein the at least one signal processing device is configured and arranged to obtain system timing offset information corresponding to the at least one local timestamp value, and to generate the time stamp for the debug information that is aligned to a system timing reference using the at least one local timestamp value and the system timing offset information.

16. The signal processing device of claim 15, wherein the system timing offset information includes a measure to indicate an extent to which the local timestamp value is offset from the system timing reference obtained from the master node and a network propagation delay between the signal processing device and the master node.

17. A method of enabling temporal alignment of debug information for a signal processing system, the method comprising, within a signal processing device:

transmitting data across at least one data link layer of the signal processing system using at least one processing core of the signal processing device;

receiving debug information using the signal processing device;

obtaining, using at least one timestamp generation circuitry of the signal processing device, a local timestamp value used for timestamping of data packets within the data link layer of the signal processing device;

timestamping, using at least one debug module including circuitry of the signal processing device, the received debug information based at least partially on the local timestamp value received from the at least one timestamp generation circuitry;

temporally aligning the timestamping of the debug information with a system timing reference, the system timing reference including a precision time protocol message indicative of a system reference time of the signal processing system;

receiving the precision time protocol message from a precision time protocol master node;

adjusting the local timestamp value based on the system timing reference;

timestamping the debug information and the data packets within the at least one data link layer with the adjusted local timestamp value; and outputting the timestamped debug information to a debug tool of the signal processing system.

18. The method of claim 17, further including:

timestamping the received debug information and the data packets within the data link layer of the signal processing device using the local timestamp value, and outputting the timestamp debug information to an external debug tool, the timestamped debug information being temporally aligned with debug information from other signal processing devices of the signal processing system located at different physical locations than the signal processing device.

* * * * *